(12) United States Patent
Kobayashi et al.

(10) Patent No.: US 8,631,820 B2
(45) Date of Patent: Jan. 21, 2014

(54) HYDRAULIC CONTROL VALVE FOR CONSTRUCTION MACHINERY

(75) Inventors: Masayuki Kobayashi, Yokohama (JP); Toshihide Shimozono, Zama (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 353 days.

(21) Appl. No.: 13/024,050

(22) Filed: Feb. 9, 2011

(65) Prior Publication Data

US 2011/0192474 A1     Aug. 11, 2011

(30) Foreign Application Priority Data

Feb. 10, 2010   (JP) .................. 2010-027485

(51) Int. Cl.
  *F16K 15/00*   (2006.01)
(52) U.S. Cl.
  USPC ... 137/512.2; 137/513; 137/538; 137/596.18; 137/596.14
(58) Field of Classification Search
  USPC ........... 137/110–112, 385, 493.1, 493.9, 512, 137/512.2, 513, 528, 535, 538, 596.18, 137/596.14
  See application file for complete search history.

(56) References Cited

U.S. PATENT DOCUMENTS

| | | | | |
|---|---|---|---|---|
| 2,335,814 A | * | 11/1943 | Stevenson | 137/111 |
| 4,257,443 A | * | 3/1981 | Turney | 137/269.5 |
| 4,270,567 A | * | 6/1981 | Tsukimoto | 137/493.5 |
| 4,570,671 A | * | 2/1986 | Constantinian | 137/596 |
| 6,978,607 B2 | * | 12/2005 | Matsumoto et al. | 60/452 |
| 7,140,385 B2 | * | 11/2006 | Thoms et al. | 137/493.6 |
| 2003/0200747 A1 | * | 10/2003 | Matsumoto et al. | 60/452 |
| 2006/0142107 A1 | * | 6/2006 | Kobayashi et al. | 475/116 |
| 2010/0059130 A1 | * | 3/2010 | Tougasaki et al. | 137/613 |

FOREIGN PATENT DOCUMENTS

JP    2002-155903    5/2002

OTHER PUBLICATIONS

English Language Abstract of JP 2002-155903 published May 13, 2002.
English Language Translation of JP 2002-155903 published May 13, 2002.

* cited by examiner

*Primary Examiner* — Craig Schneider
*Assistant Examiner* — Jessica Cahill
(74) *Attorney, Agent, or Firm* — DLA Piper LLP (US)

(57) ABSTRACT

It is addressed to provide a hydraulic control valve for preventing high-speed rotation of a valve body of a check valve incorporated in the hydraulic control valve of a type that pressure oil is supplied from a tandem, path and a parallel path via the check valve. A check valve unit is constituted by a main unit and a valve body of a first check valve. A throttle is provided on a right side of an O-ring groove. On a main unit side, there is formed a cylindrical housing portion in which a threaded portion is formed on an outer peripheral portion for fixation to a casing of the hydraulic control valve. On an inner peripheral surface of the housing portion, a groove is formed in an axial direction. Meanwhile, the valve body of the first check valve has a rib. At a time of assembly, the rib, is inserted into the groove of the main unit as indicated by an arrow. After the valve body is assembled to the main unit and fixed to the casing, even with imbalance such as phase shift of the pressure-oil path, the rib having fit into the groove, namely the valve body, is prevented to rotate while it is slidable in the axial direction. Thus, the casing of a seating part of the valve body is not abraded.

6 Claims, 4 Drawing Sheets

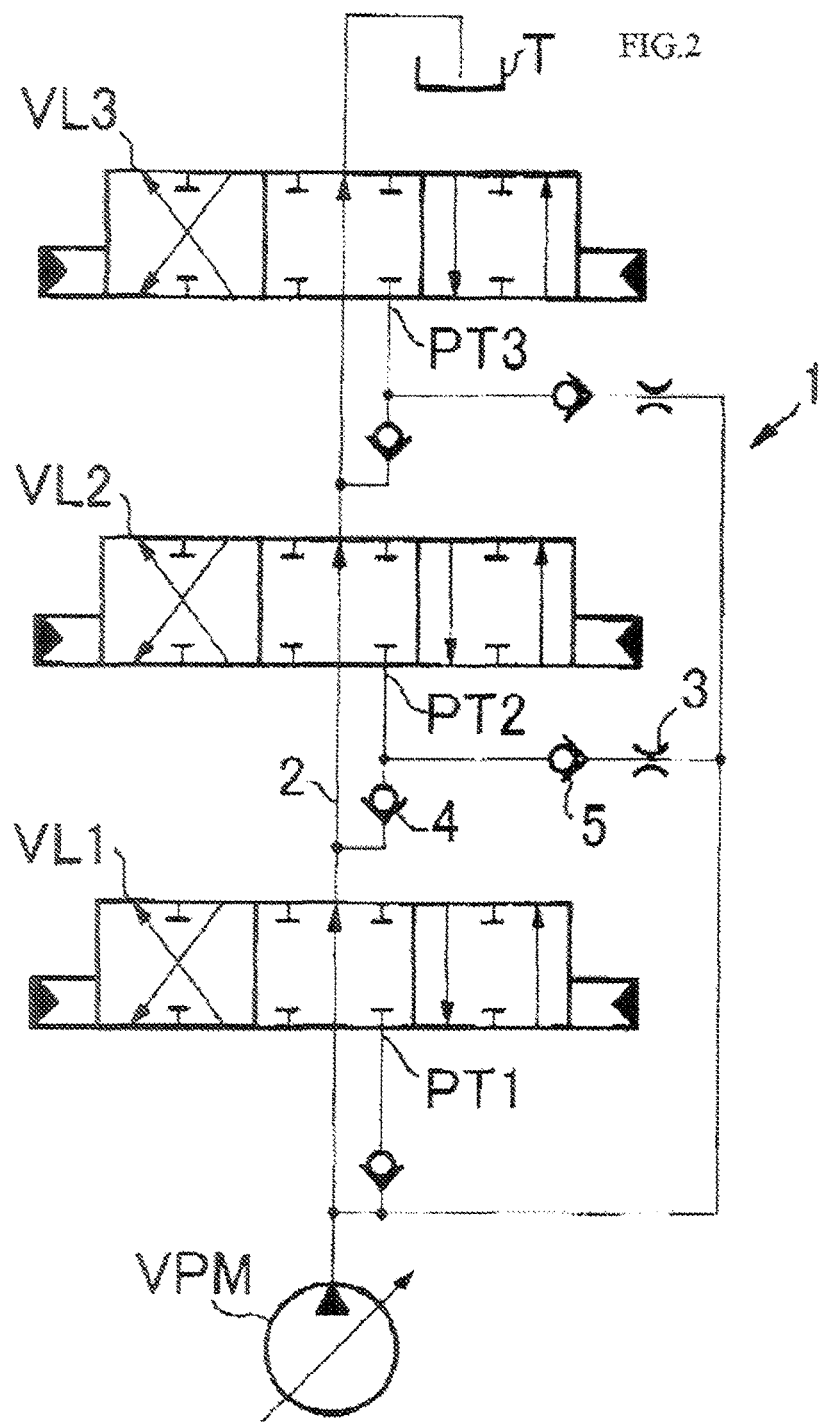

--PRIOR ART--

HYDRAULIC CONTROL VALVE FOR CONSTRUCTION MACHINERY

BACKGROUND OF THE INVENTION

1. Field of the Invention

The present invention relates to a hydraulic control valve used for construction machinery such as a hydraulic shovel, and more particularly, to structure of a check valve incorporated in the hydraulic control valve.

2. Description of the Related Art

Construction machinery, for example, a hydraulic shovel normally comprises hydraulic cylinders for driving a boom, an arm, a shovel, and the like, and hydraulic motors for driving a swivel base, a travelling caterpillar, or a vehicle. To each of the hydraulic actuators, a required pressure oil is supplied from hydraulic pumps via each of hydraulic control valves of a control valve unit mounted on the swivel base.

Incidentally, as illustrated in FIG. 1 of JP 2002-155903 A (hereinafter, referred to as Patent Document 1), the control valve unit is provided with switching valves k1, k2, and k3 connected in tandem via a center bypass path 34. The switching valves k2 and k3 are provided with check valves via a parallel line 32. Further, on a downstream side of each of the check valves, each of the switching valves k2 and k3 is provided with another check valve provided between each of the check valves and the center bypass path 34.

FIG. 2 of the present application refers to a control valve 6 which is a hydraulic circuit part of FIG. 1 of the Patent Document 1 described above, and simply illustrates only a part relevant to the invention of the present application. Note that, in the following description, a component corresponding to the switching valve in the Patent Document 1 is referred to as a hydraulic control valve, and a component corresponding to the control valve therein is referred to as a control valve unit.

In FIG. 2, three hydraulic control valves VL1 to VL3 are connected in tandem to each other. Apart of pressure oil delivered from a variable delivery pump VPM is provided to the tandem path 2, another part thereof passes a bypass path 1, a throttle 3 and a check valve 5 and, merges with the part of pressure oil having passed a check valve 4 in parallel provided in a path branched from the tandem path 2, with the result of being fed to a port PT2 of the hydraulic control valve VL2. The hydraulic control valve VL3 has the similar circuit configuration.

The configuration of FIG. 2 enables simultaneously driving of a low-load hydraulic actuator and a high-load hydraulic actuator. The throttle 3 is adjusted in accordance with a magnitude of a load. Further, the check valve 4 prevents backflow into the tandem path 2, and the check valve 5 prevents backflow into a parallel path 1.

FIG. 3 illustrates a main part of the structure of the hydraulic control valve VL2. In FIG. 3, in the hydraulic control valve VL2, a spool Spr is arranged in a hole passing though the inside of its casing CS. Reference symbols a and b shows pressure-oil ports for controlling the position of the spool Spr. Paths i and ii illustrated in the center of the figure constitute branch paths for supplying pressure oil supplied from the tandem path 2 or the bypass path 1 originally from a pump in accordance with the position of the spool Spr into ports APT or BPT. The branch operation of the pressure oil is performed by a check valve unit CH.

In the check valve unit CH, a main unit 6 thereof has an upper portion provided with the throttle 3, a lower portion provided with an opening portion c, and an outer peripheral portion provided with a threaded portion d for attachment to the casing CS.

The opening portion c in the lower portion of the check valve unit CH houses the first check valve 4 facing the tandem path 2 and having a downward first valve body 4a seating on a seating surface of the casing CS in the illustration, and the second check valve 5 having an upward second valve body 5a slidably housed in the first check valve 4. That is, in order to achieve compactification of structure as a hydraulic control valve, it has a constitution in which two check valves are coupled to each other.

Note that, each of the valve bodies 4a and 5a are urged downward and upward by springs (not shown).

As illustrated in the cross-section A-A, the first check valve 4 has an outer periphery substantially quadrangular in cross-section. Reference symbol 4b between the first check valve 4 and the cylindrical lower portion of the check valve unit CH constitutes a path for leading the pressure oil from the bypass path 1 into the path i or ii.

However, the conventional structure illustrated in FIG. 3 has the following problems.

That is, imbalance of a fluid force around the first check valve 4 causes the first check valve 4 to rotate at high speed due to a phase shift accompanying errors in machine processing on the throttle 3 or due to a flow-path shape on a downstream side of the first check valve 4, further the first valve body 4a is pressed against the seating surface of the casing CS, thus there has occurred a phenomenon that pressure oil passing through the path 4b abrades the casing itself. Since the casing CS is made of a cast metal and the valve body 4a is made of a steel material, the abrasion progresses to a lower side in FIG. 3 especially in a state in which an oil film on the seating surface has run out, and it may lead to a risk of destruction of a regular function as a hydraulic control valve. Further, the high-speed rotation of the first valve body 4a wastes energy of pressure oil, with the result that it may cause hydraulic oil to heat.

SUMMARY OF THE INVENTION

As a result of intensive studies, the inventors of the present invention have found out that those problems can be basically solved by preventing a rotation of the valve body of the first check valve.

Therefore, the present invention has an object to provide a hydraulic control valve for preventing high-speed rotation of a valve body of a check valve incorporated in the hydraulic control valve of a type that pressure oil is supplied from a tandem path and a parallel path via the check valve.

To achieve the object, a hydraulic control valve of the present invention is that for construction machinery for taking in pressure oil from one of a tandem path and a parallel path which are connected to a variable delivery pump, characterized in that:

a check valve unit is fixedly incorporated in a casing, the check valve unit slidably and unrotatably housing a valve body of a first check valve which operates so as to block communication with the tandem path in a state in which the pressure oil from the parallel path is supplied; and a pressure-oil path from the parallel path is formed between an inner peripheral surface of the housing portion of the check valve unit and an outer peripheral surface of the valve body.

In the hydraulic control valve, as the check valve unit for unrotatably housing the valve body, a rib may be provided on a sliding direction on an outer surface of the valve body of the first check valve, the rib having a predetermined length; and a groove for receiving the rib may be formed on the inner peripheral surface of the housing portion of the check valve unit. Alternatively, it is possible that, as the check valve unit for unrotatably housing the valve body, a rib is provided on the inner peripheral surface of the housing portion of the check valve unit, the rib having a predetermined length, and a groove for receiving the rib is formed on an outer surface of the valve body of the first check valve.

Further, in these hydraulic control valves, the check valve unit may comprise a second check valve for blocking flux of the pressure oil from the parallel path into the pressure-oil path.

Still further, it is preferred to configure a valve body of the second check valve to be housed in the valve body of the first check valve.

According to the present invention, a check valve unit is fixedly incorporated in a casing, the check valve unit slidably and unrotatably housing a valve body of a first check valve which operates so as to block communication with the tandem path in a state in which the pressure oil from the parallel path is supplied, and a pressure-oil path from the parallel path is formed between an inner peripheral surface of the housing portion of the check valve unit and an outer peripheral surface of the valve body. Thus, even with imbalance of flow of pressure oil in the pressure-oil path and on a downstream side thereof, abrasion of the casing can be reduced as quickly as possible because the rotation of the valve body is prevented. Further, energy of pressure oil is not wasted, and heat is not generated in the hydraulic oil. Still further, synergistically with forming the pressure-oil path as described above, in the hydraulic control valve in which the check valve unit described above is incorporated, vibration, noise, or internal breakage does not occur because cavitation does not occur in the casing CS.

BRIEF DESCRIPTION OF THE DRAWINGS

FIG. 2 is a general circuit diagram of a plurality of hydraulic control valves connected to each other via a tandem path and a parallel path;

DETAILED DESCRIPTION OF THE PREFERRED EMBODIMENT

In the following, detailed description is made of a preferred embodiment of the present invention with reference to FIG. 1.

Figure 1:
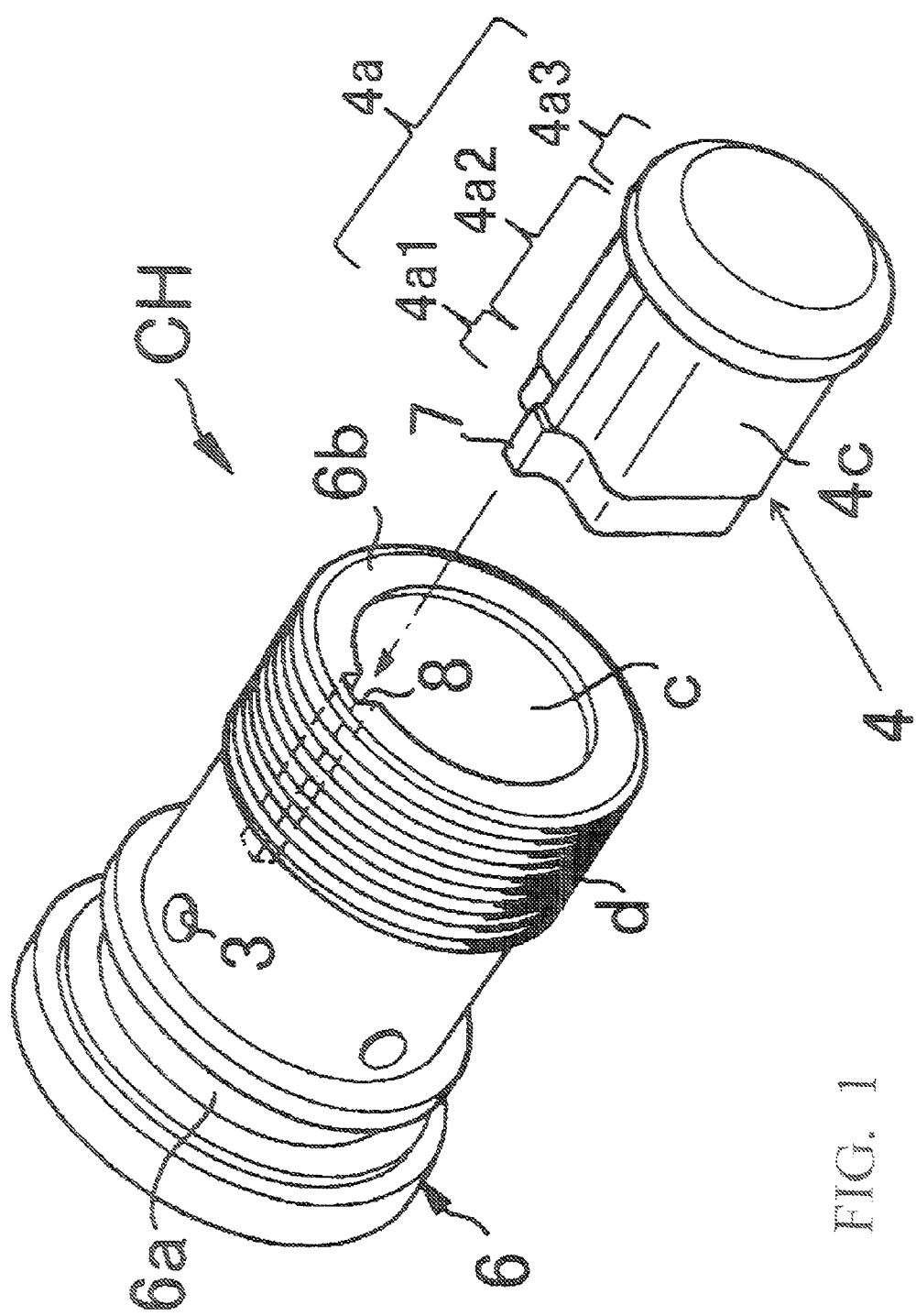
FIG. 1 is a perspective view of a check valve unit which is prior to assembly and to be incorporated in a casing of a hydraulic control valve according to the present invention.
Figures 3A, 3B:
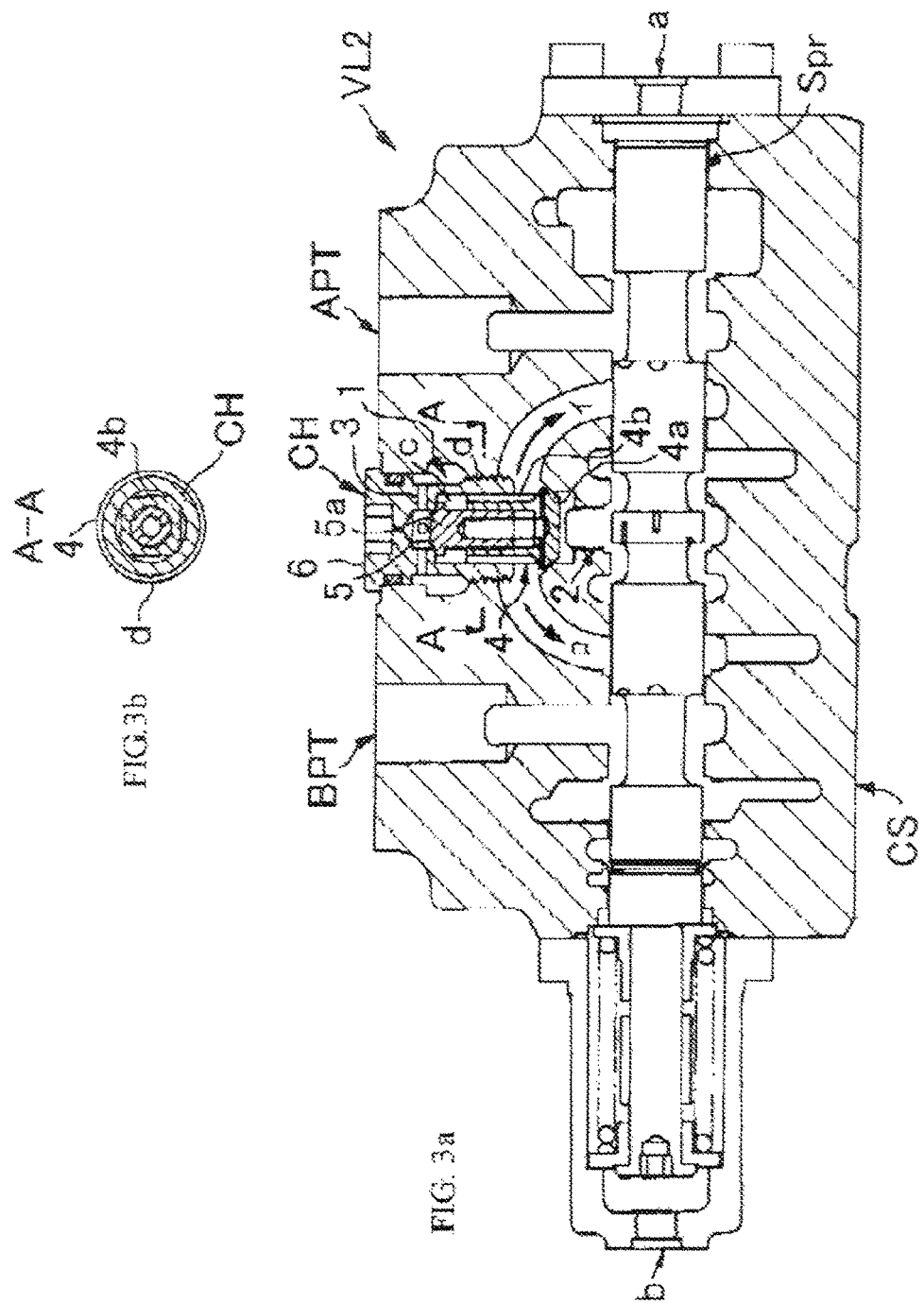
FIG. 3a is a sectional view taken along an axial direction of a spool of a conventional hydraulic control valve.
FIG. 3b is a cross-sectional view of check valve of a conventional hydraulic control valve.

FIG. 1 is a perspective view of a check valve unit which is prior to assembly and to be incorporated in a casing of a hydraulic control valve according to the present invention. In the following description, elements corresponding to those illustrated in FIG. 3 are denoted by the same reference symbols.

In FIG. 1, a check valve unit CH comprises a main unit 6 and a valve body 4a of a first check valve 4. An O-ring groove is denoted by reference symbol 6a. A throttle is denoted by reference numeral 3. A cylindrical housing portion is denoted by reference symbol 6b which has an outer peripheral portion provided with a threaded portion d for fixing the main unit 6 to a casing CS of a hydraulic control valve VL2. An opening portion on an inner peripheral side of the housing portion 6b is denoted by reference symbol c. On the inner peripheral surface of the housing portion 6b, there is formed a groove 8 in an axial direction.

Meanwhile, the valve body 4a of the first check valve 4 is provided with a rib 7, a side wall 4c having a flat-surface shape so as to form a pressure-oil path 4b, and a seating part 4a3 coming in contact with a seating surface of the casing CS when the check valve unit opens. When the valve body 4a is assembled to the main unit 6, the rib 7 is inserted into the groove 8 of the main unit 6 as indicated by an arrow. Fitting of the valve body 4a into the opening portion c of the main unit 6 causes the valve body 4a to be assembled to the main unit 6.

When the check valve unit closes, the seating part 4a3 of the valve body 4a and the housing portion 6b come into contact. The side wall 4c of the valve body 4a is provided so as to allow pressure oil to pass. A section 4a2 is configured to be smaller in width than the opening portion c of the main unit 6. The valve body 4a is configured so as to be slidable in the main unit 6. Further, a section 4a1 of the valve body 4a is configured to be smaller in width than the section 4a2, the section 4a1 being provided with the rib 7. The section 4a3 is larger in width than the opening portion c of the main unit 6. After the valve body 4a is assembled to the main unit 6 and fixed to the casing CS, even with imbalance in the valve body 4a such as phase shift of the pressure-oil path 4b, the rib 7 fitting into the groove 8, namely, the valve body 4a is prevented from being rotated while being slidable in the axial direction. Thus, also when the check valve unit opens and then the section 4a3 and the seating surface of the casing CS come into contact, the valve body 4a of the first check valve 4 does not rotate, and hence the seating surface of the casing CS is not abraded. Further, energy of pressure oil is not wasted, and heat is not generated in hydraulic oil. Further, synergistically with the configuration which allows the pressure oil to pass as described above, in a hydraulic control valve in which the check valve unit as illustrated in FIG. 1 is incorporated, cavitation does not occur in the casing CS. Thus, not only vibration and noise do not occur, but also internal breakage does not occur.

Hereinabove, description has been made of the preferred embodiment of the present invention. In this context, those skilled in the art may make various modifications on rotation-preventing means illustrated in FIG. 1. For example, the groove 8 and the rib 7 may be formed in multiple pairs at equal intervals on a circumference. Further, when the valve body 4a has a size which is capable of making the valve body 4a slidable in the main unit 6 and allows the pressure oil to pass in the main unit 6, for example, the width of the section 4a1 may be set to be equal to or larger than that of the section 4a2.

Figure 4:
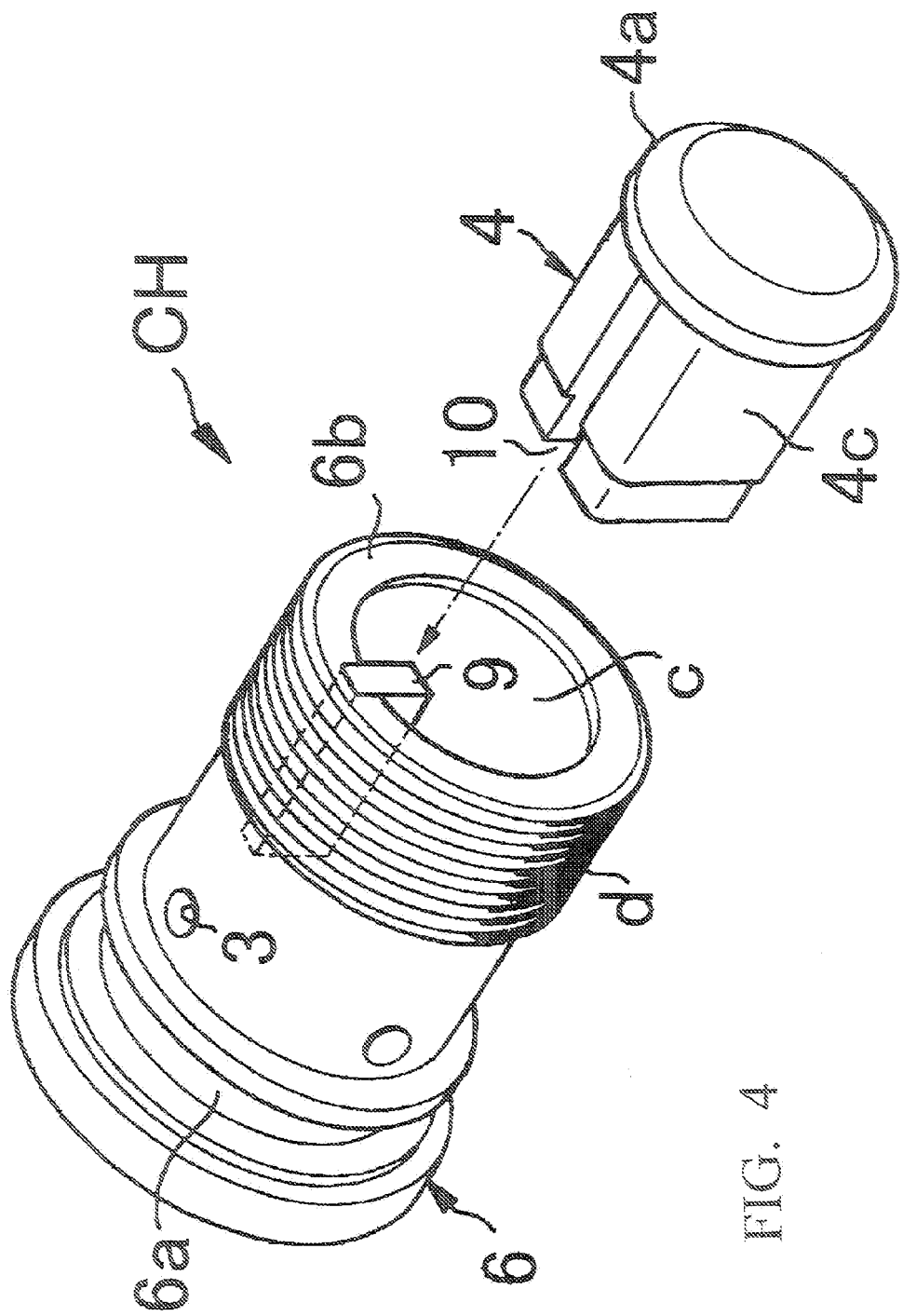
FIG. 4 is a perspective view of a check valve unit according to another embodiment, the check valve unit being prior to assembly and to be incorporated in the casing of the hydraulic control valve according to the present invention.

Alternatively, as illustrated in FIG. 4, it is possible to configure such that a rib 9 is provided on an inner peripheral surface of the housing portion of the main unit 6, and a groove 10 is provided in an outer surface of the valve body 4a. In this case, when the valve body 4a is assembled to the main unit 6, the groove 10 is inserted into the rib 9 of the main unit 6 as indicated by an arrow. The side wall represented by reference symbol 4c has a flat-surface shape so as to form the pressure-oil path 4b. After the valve body 4a is assembled to the main unit 6 and fixed to the casing CS, even with the imbalance in the valve body 4a such as phase shift of the pressure-oil path 4h, the rib 9 fitting into the groove 10, namely, the valve body 4a is prevented from being rotated while being slidable in the axial direction. Thus, also when the check valve unit opens and then the seating portion of the valve body 4*a* and the seating surface of the casing CS come into contact, the valve body 4*a* of the first check valve 4 does not rotate, and hence the seating surface of the casing CS is not abraded. Further, energy of pressure oil is not wasted, and heat is not generated in hydraulic oil. Further, synergistically with the configuration which allows the pressure oil to pass as described above, also in a hydraulic control valve in which the check valve unit as illustrated in FIG. 4 is incorporated, cavitation does not occur in the casing CS. Thus, not only vibration and noise do not occur, but also internal breakage does not occur.

What is claimed is:

1. A hydraulic control valve for construction machinery for taking in pressure oil from one of a tandem path and a parallel path which are connected to a variable delivery pump, wherein
- a check valve unit is fixedly incorporated in a casing, the check valve unit having an opening portion on an inner peripheral side of a housing portion, and slidably and unrotatably housing a valve body of a first check valve which operates so as to block communication with the tandem path in a state in which the pressure oil from the parallel path is supplied, and
- a pressure-oil path from the parallel path is formed between an inner peripheral surface of the housing portion of the check valve unit and an outer peripheral surface of the valve body;
- wherein the valve body of the first check valve comprises:
  - a seating part that is larger in width than the opening portion of the check valve unit, which comes into contact with the housing portion of the check valve unit when the check valve unit closes;
  - a first section connected to the seating part that is smaller in width than the opening portion of the check valve unit;
  - a second section connected to the first section that is smaller in width than the first section; and
  - a rib formed in a sliding direction on an outer surface of the second section, the rib having a predetermined length; and
  - wherein a groove for receiving the rib is formed on the inner peripheral surface of the housing portion of the check valve unit.

2. The hydraulic control valve for construction machinery according to claim 1, wherein the check valve unit comprises a second check valve for blocking flux of the pressure oil from the parallel path into the pressure-oil path.

3. The hydraulic control valve for construction machinery according to claim 2, wherein a valve body of the second check valve is slidably housed in the valve body of the first check valve.

4. A hydraulic control valve for construction machinery for taking in pressure oil from one of a tandem path and a parallel path which are connected to a variable delivery pump, wherein
- a check valve unit is fixedly incorporated in a casing, the check valve unit having an opening portion on an inner peripheral side of the of a housing portion, and slidably and unrotatably housing a valve body of a first check valve which operates so as to block communication with the tandem path in a state in which the pressure oil from the parallel path is supplied, and
- a pressure-oil path from the parallel path is formed between an inner peripheral surface of a housing portion of the check valve unit and an outer peripheral surface of the valve body,
- wherein, the housing portion of the check valve unit comprises:
  - a rib formed on the inner peripheral surface of the housing portion of the check valve unit, the rib having a predetermined length; and
- wherein the valve body of the check valve unit comprises:
  - a seating part that is larger in width than the opening portion of the check valve unit, which comes into contact with the housing portion of the check valve unit when the check valve unit closes;
  - a first section connected to the seating part that is smaller in width than the opening portion of the check valve unit;
  - a second section connected to the first section that is smaller in width than the first section; and
- a groove for receiving the rib is formed on an outer surface of the first and second sections of the valve body of the first check valve.

5. The hydraulic control valve for construction machinery according to claim 4, wherein the check valve unit comprises a second check valve for blocking flux of the pressure oil from the parallel path into the pressure-oil path.

6. The hydraulic control valve for construction machinery according to claim 5, wherein a valve body of the second check valve is slidably housed in the valve body of the first check valve.

* * * * *